United States Patent
Cordova Val et al.

(10) Patent No.: US 8,626,140 B2
(45) Date of Patent: Jan. 7, 2014

(54) METHOD FOR ADAPTING RADIOFREQUENCY SIGNAL SPECTRUM

(75) Inventors: Javier Cordova Val, Saragossa (ES); Pedro Luis Diaz Herce, Saragossa (ES); Alfredo Calderon, Saragossa (ES)

(73) Assignee: Teltronic, S.A.U., Zaragoza (ES)

( * ) Notice: Subject to any disclaimer, the term of this patent is extended or adjusted under 35 U.S.C. 154(b) by 441 days.

(21) Appl. No.: 12/501,205

(22) Filed: Jul. 10, 2009

(65) Prior Publication Data

US 2011/0009104 A1    Jan. 13, 2011

(51) Int. Cl.
*H04M 3/00*    (2006.01)
(52) U.S. Cl.
USPC ........ 455/418; 455/403; 455/422.1; 455/425; 455/426.1
(58) Field of Classification Search
USPC ........ 455/418, 432.1, 432.2, 432.3, 434, 507, 455/525, 526; 370/315, 316
See application file for complete search history.

(56) References Cited

U.S. PATENT DOCUMENTS

| | | | |
|---|---|---|---|
| 2004/0101074 A1* | 5/2004 | Wilson | 375/350 |
| 2007/0005352 A1 | 1/2007 | Vaisanen et al. | |
| 2008/0130545 A1* | 6/2008 | Green | 370/311 |
| 2009/0036086 A1 | 2/2009 | Chen et al. | |
| 2009/0129354 A1* | 5/2009 | Gupta et al. | 370/338 |
| 2009/0325625 A1* | 12/2009 | Hugl et al. | 455/522 |
| 2010/0099406 A1* | 4/2010 | Anantharaman et al. | 455/434 |
| 2010/0265848 A1* | 10/2010 | Kummetz et al. | 370/255 |

OTHER PUBLICATIONS

ETSI EN 300 392-1, V1.4.1 (Jan. 2009), Terrestrial Trunked Radio (TETRA); Voice Plus Data (V+D); Part 1: General network design (pp. 1-180).
ETSI EN 300 392-2 V2.5.2 (Nov. 2005), Terrestrial Trunked Radio (TETRA); Voice Plus Data (V+D); Part 2: Air Interface (AI) (pp. 1-898).
ETSI EN 300 392-7, V2.3.1 (Jun. 2006), Terrestrial Trunked Radio (TETRA); Voice plus Data (V+D); Part 7: Security (pp. 1-173).
ETSI EN 300 396-2, V1.3.1 (Sep. 2006), Terrestrial Trunked Radio (TETRA); Technical requirements for Direct Mode Operation (DMO); Part 2: Radio aspects (pp. 1-51).
ETSI EN 300 396-3, V1.3.1 (Aug. 2006), Terrestrial Trunked Radio (TETRA); Technical requirements for Direct Mode Operation (DMO); Part 3: Mobile Station to Mobile Station (MS-MS) Air Interface (AI) protocol (pp. 1-201).
ETSI EN 300 396-4, V1.3.1 (May 2006), Terrestrial Trunked Radio (TETRA); Technical requirements for Direct Mode Opearation (DMO); Part 4: Type 1 repeater air interface (pp. 1-107).
ETSI EN 300 396-5, V1.2.1 (May 2006), Terrestrial Trunked Radio (TETRA); Technical requirements for Direct Mode Operation (DMO); Part 5: Gateway air interface (pp. 1-275).

* cited by examiner

*Primary Examiner* — Kathy Wang-Hurst
(74) *Attorney, Agent, or Firm* — Sughrue Mion, PLLC

(57) ABSTRACT

Method for adapting radiofrequency signal spectrum, particularly in TETRA communications systems. The invention proposes using over-the-air signaling for communications systems according to the TETRA standard, to configure the characteristics of the radiofrequency signal, with the advantage that there is no loss of performance in data transmission speed and no need to change the type of modulation.

21 Claims, 6 Drawing Sheets

620          ETSI EN 300 392-2 V3.2.1 (2007-09)

Table 21.73: SYNC PDU contents

| Information element | Length | Type | Value | Remark |
|---|---|---|---|---|
| System code | 4 | M | $0000_2$ | ETS 300 392-2 ed. 1 (no security functions) |
| | | | $0001_2$ | ETS 300 392-2 ed. 1 and EN 300 392-7 [8] V2.1.1 |
| | | | $0010_2$ | EN 300 392-2 V2.3.2 to V2.6.1, and EN 300 392-7 [8] V2.1.1 to V2.4.1 |
| | | | $0011_2$ | EN 300 392-2 V3.1.1 and EN 300 392-7 [8] V3.1.1 |
| | | | $0XXX_2$ | Other $XXX_2$ values V+D reserved |
| | | | $100y_2$ | Reserved |
| | | | $101y_2$ | Direct Mode Operation, see EN/ETS 300 396 (DMO) |
| | | | $11zz_2$ | Direct Mode Operation, see EN/ETS 300 396 |
| Colour code | 6 | M | $000000_2$ | Pre-defined scrambling, see note |
| | | | $000001_2$ | Operator defined scrambling, for cell identifier and scrambling process as defined in clause 8 |
| | | | etc. | etc. |
| | | | $111111_2$ | Operator defined scrambling, for cell identifier and scrambling process as defined in clause 8 |
| Timeslot number | 2 | M | $00_2$ | Timeslot 1 |
| | | | $01_2$ | Timeslot 2 |
| | | | $10_2$ | Timeslot 3 |
| | | | $11_2$ | Timeslot 4 |
| Frame number | 5 | M | $00000_2$ | Reserved |
| | | | $00001_2$ | Frame 1 |
| | | | etc. | etc. |
| | | | $10010_2$ | Frame 18 |
| | | | Others | Reserved |
| Multiframe number | 6 | M | $000000_2$ | Reserved |
| | | | $000001_2$ | Multiframe 1 |
| | | | etc. | etc. |
| | | | $111100_2$ | Multiframe 60 |
| | | | Others | Reserved |
| Sharing mode | 2 | M | $00_2$ | Continuous transmission |
| | | | $01_2$ | Carrier sharing |
| | | | $10_2$ | MCCH sharing |
| | | | $11_2$ | Traffic carrier sharing |
| TS reserved frames | 3 | M | $000_2$ | 1 frame reserved per 2 multiframes |
| | | | $001_2$ | 2 frames reserved per 2 multiframes |
| | | | $010_2$ | 3 frames reserved per 2 multiframes |
| | | | $011_2$ | 4 frames reserved per 2 multiframes |
| | | | $100_2$ | 6 frames reserved per 2 multiframes |
| | | | $101_2$ | 9 frames reserved per 2 multiframes |
| | | | $110_2$ | 12 frames reserved per 2 multiframes |
| | | | $111_2$ | 18 frames reserved per 2 multiframes |
| U-plane DTX | 1 | M | 0 | Discontinuous U-plane transmission is not allowed |
| | | | 1 | Discontinuous U-plane transmission is allowed |
| Frame 18 extension | 1 | M | 0 | No frame 18 extension |
| | | | 1 | Frame 18 extension allowed |
| Reserved | 1 | M | 0 | Default value |
| | | | 1 | Not used in the present document |
| TM-SDU (MLE data) | 29 | M | | As defined in clause 18 (D-MLE-SYNC) |
| NOTE: The element Colour code with the value "Predefined scrambling" means that all 30 bits of the scrambling vector are zeros. | | | | |

*ETSI*

Figure 2

157 ETSI EN 300 395-3 V1.3.1 (2006-08)

Table 21: DMAC-SYNC PDU contents in SCH/S

| Information element | Length | Type | Remark |
|---|---|---|---|
| System code | 4 | M | |
| SYNC PDU type | 2 | M | Value $00_2$ indicates DMAC-SYNC PDU |
| Communication type | 2 | M | Set to $00_2$ for direct MS-MS operation |
| Master/slave link flag | 1 | C | Included if communication type = $01_2$ or $11_2$ |
| Reserved | 1 | C | Included if communication type = $00_2$ or $10_2$ Default value = 0 |
| Gateway generated message flag | 1 | C | Included if communication type = $10_2$ or $11_2$ |
| Reserved | 1 | C | Included if communication type = $00_2$ or $01_2$ Default value = 0 |
| A/B channel usage | 2 | M | |
| Slot number | 2 | M | |
| Frame number | 5 | M | |
| Air interface encryption state | 2 | M | Determines interpretation of following 39 bits |
| Time Variant Parameter | 29 | C | Included if air interface encryption state ≠ $00_2$ |
| Reserved | 1 | C | Included if air interface encryption state ≠ $00_2$ Default value = 0 |
| KSG number | 4 | C | Included if air interface encryption state ≠ $00_2$ |
| Encryption key number | 5 | C | Included if air interface encryption state ≠ $00_2$ |
| Reserved | 39 | C | Included if air interface encryption state = $00_2$ Default value = all zeros |

Table 22: DMAC-SYNC PDU contents in SCH/H

| Information element | Length | Type | Remark |
|---|---|---|---|
| Repeater address | 10 | C | Included if communication type = $01_2$ |
| Gateway address | 10 | C | Included if communication type = $10_2$ or $11_2$ |
| Reserved | 10 | C | Included if communication type = $00_2$. Default value = all zeros |
| Fill bit indication | 1 | M | |
| Fragmentation flag | 1 | M | |
| Number of SCH/F slots | 4 | C | Included if fragmentation flag = 1 |
| Frame countdown | 2 | M | |
| Destination address type | 2 | M | See note |
| Destination address | 24 | C | Included if destination address type ≠ $10_2$ (so always present for direct MS-MS operation and for operation with a DM-REP) |
| Source address type | 2 | M | Note |
| Source address | 24 | C | Included if source address type ≠ $10_2$ (so always present for direct MS-MS operation and for operation with a DM-REP) |
| Mobile Network Identity | 24 | C | Always present if communication type = $00_2$ or $01_2$. For communication type = $10_2$ or $11_2$ see EN 300 396 -5 [5] |
| Message type | 5 | M | |
| Message dependent elements | varies | C | |
| DM-SDU | varies | C | |
| NOTE: Neither the destination address type nor the source address type in DMAC-SYNC shall be set to $10_2$ for direct MS-MS operation or for operation with a DM-REP. | | | |

Figure 4

METHOD FOR ADAPTING RADIOFREQUENCY SIGNAL SPECTRUM

OBJECT OF THE INVENTION

The present invention relates to a method for adapting radiofrequency signal spectrum, particularly for TETRA communications systems.

The invention proposes using over-the-air signaling to configure the characteristics of the radiofrequency (RF) signal with digital modulation used in TETRA systems. The roll-off factor (α) of the root raised cosine (RRC) filter and the power level of the RF signal, for example, are configured during transmission whereas the RRC filter is modified during reception such that its response is adapted to that of the transmission filter.

The field of application of the invention is the telecommunications sector, and more specifically, in radiofrequency communication systems.

BACKGROUND OF THE INVENTION

The radioelectric spectrum is a shared and limited resource. Therefore, each country establishes rules for the use thereof, specifying the spectral characteristics a radiofrequency transmission must have.

In digital communications systems, the information is encoded using symbols, to which a low-pass filter is applied to adjust the bandwidth of the signal to the width of the assigned channel. This filter, referred to as channel filter, must comply with the Nyquist Stability Criterion.

The most commonly used channel filtering system with digital modulated signals consists of two root raised cosine (RRC) filters, one in the transmitter and the complex conjugate thereof in the receiver. The combination of both filters results in an RC filter, which is characterized by reducing inter-symbol interference (ISI). This interference worsens the quality of the signal, making it difficult for the receiver to suitably decode the received symbols.

In order to assure interoperability between equipments from different manufacturers, communications standards, such as TETRA, define each and every one of the aspects of the various ISO levels. With respect to the physical level, they define characteristics such as the type of modulation, the data transmission rate or the RRC filter which must be used. The characteristics of said filter depend on two factors: the roll-off factor (α) and the symbol time (T). Specifically, the filter to be used by each of the modulations contemplated in the TETRA standard for voice plus data (V+D) systems is defined in document ETSI EN 300 392-2 *"Terrestrial Trunked Radio (TETRA); Voice plus Data (V+D); Part 2: Air Interface (AI)"*. For TETRA equipments in direct mode operation (DMO), the channel filter is defined in document ETSI EN 300 396-2 *"Terrestrial Trunked Radio (TETRA); Technical requirements for Direct Mode Operation (DMO); Part 2: Radio aspects"*.

Document ETSI EN 300 392-2 defines all the air interface for TETRA systems supporting voice plus data (V+D) and it contains the specifications for the physical level, link level and network level, according to the ISO model.

The air interface for TETRA equipments in DMO, in addition to in the already mentioned ETSI EN 300 396-2, is defined in the following documents:

ETSI EN 300 396-3 *"Terrestrial Trunked Radio (TETRA); Technical requirements for Direct Mode Operation (DMO); Part 3: Mobile Station to Mobile Station (MS-MS) Air Interface (AI) protocol"*.

ETSI EN 300 396-4 *"Terrestrial Trunked Radio (TETRA); Technical requirements for Direct Mode Operation (DMO); Part 4: Type 1 repeater air interface"*.

ETSI EN 300 396-5 *"Terrestrial Trunked Radio (TETRA); Technical requirements for Direct Mode Operation (DMO); Part 5: Gateway air interface"*.

All these standards define the various data units (PDU) used within layer 2, or link level, including the media access control (MAC) PDUs. The synchronization or SYNC PDUs are defined within this group of PDUs (ETSI EN 300 392-2 section 21.4.4.2; ETSI EN 300 396-3 section 9.1.1; ETSI EN 300 396-4 section 10.1.2; ETSI EN 300 396-5 section 14.1.1).

The SYNC PDU is transmitted either by the base station using the BSCH logical channel, or by a terminal in DMO mode in the SCH/S and SCH/H logical channels.

The "System Code" field is included among the various fields forming the SYNC PDU, which consists of 4 bits. The values comprised between 0000 and 0011 are used to indicate the edition of the EN/ETS 300 392-2 (*"Terrestrial Trunked Radio (TETRA); Voice plus Data (V+D); Part 2: Air Interface (AI)"*) and EN 300 392-7 (*"Terrestrial Trunked Radio (TETRA); Voice plus Data (V+D); Part 7: Security"*) standards; values from 0100 to 0111 are reserved for voice plus data (V+D) systems; 1000 and 1001 are reserved for generic use; and the remaining values correspond to the Direct Mode Operation (DMO) functionality, EN/ETS 300 396 standard.

Document ETSI EN 300 392-1 *"Terrestrial Trunked Radio (TETRA); Voice plus Data (V+D); Part 1: General network design"* defines in section 7.2.4 the composition of the identification number of a terminal or group of terminals, referred to as TSI (TETRA Subscriber Identity). The first field of the TSI is the MCC (Mobile Country Code), consisting of 10 bits and identifying in which country the TETRA system is located.

There are several documents in the state of the art which refer to methods for the variation of the radio parameters of a communications system which are similar to some of the features of the present invention, but which, when considered as a whole, basically differ from this proposal.

In this sense, reference could be made, for example, to document US2007005352, which describes a method for adjusting the channel filter to the bandwidth of the signal. It relates to a system used to perform the channel filter a filter bank with a bandwidth W, both in the transmitter and in the receiver, which allows grouping a number n of these filters to transmit and receive signals with a bandwidth n*W. It relates to a dynamic variation of the bandwidth of the signal in multiples of a predetermined one, W.

Document US2009036086 relates to a radiobroadcast system in which the bandwidth of the RRC filter of the transmitter is reduced to increase spectral efficiency, whereas the RRC filters of the receivers remain with a bandwidth that is greater than the former.

The objective of the present invention differs from the proposals of the earlier documents insofar as, as previously explained, it allows adjusting at least two radio parameters: the roll-off factor of the RRC filter and the transmission power level. Furthermore, the value of the configurable radio parameters is determined from over-the-air signaling contained in the SYNC PDU of the TETRA standard, in combination with the MCC (Mobile Country Code), which allows this configuration to be performed dynamically.

This allows:

Adapting this type of system to the specific radioelectric spectrum use requirements of each country.

Optimization of the radioelectric spectrum, without losing performance in data transmission speed and without the need to change the type of modulation.

Dynamic configuration of the radio parameters of all the equipments of the system, being of special interest for equipments which are registered for the first time in the system, thus preventing being able to perform transmissions outside the limits marked by the regulations for the use of the radioelectric spectrum in the country in which the system operates.

SUMMARY OF THE INVENTION

The present invention relates to a method for adapting radiofrequency signal spectrum according to claims 1-10, to a system according to claims 11-20 and to application software of the equipments of the system to perform the method according to claim 21.

Specifically, the present invention relates to a method for adapting radiofrequency signal spectrum (i.e., the configurable radio profiles) using over-the-air signaling for communications systems according to the TETRA standard, with the advantage that there is no loss of performance in data transmission speed and no need to change the type of modulation.

As previously indicated, there are certain values of the "System Code" data field within the SYNC PDU of the TETRA standard which are reserved for generic use and which are not currently being used. These values in combination with the MCC code, which identifies the country and which is in the TSI (TETRA Subscriber Identity) block, can be dedicated to indicate therewith the various configurable radio profiles referred to. Specifically, the unused values of the "System Code" block of the SYNC PDU are 1000 and 1001 ($100y_2$).

The advantage of using this field of the SYNC PDU resides in the fact that this information must be received by the terminals of a V+D TETRA system before performing the first transmission. Therefore, no equipment can transmit with a profile different from the one established for said system. It thus prevents being able to perform transmissions outside the limits marked by the regulations for the use of the radioelectric spectrum of the country in which the system operates.

The process for defining the characteristics of a new radio profile referred to consists of:

1. Determining the required spectral characteristics of the RF signal used in the communications system. Said spectral configuration will depend on the objective sought. In this case, in order to be adapted to the specific radioelectric spectrum requirements of a country. This method can also be used to optimize the spectral efficiency. The parameters "Occupied bandwidth" ($BW_{occupied}$) and "Frequency response (Mask)" ($H(f)$), as well as the V+D TETRA standard (ETSI EN 300 392) or DMO (ETSI EN 300 396) which is used, will determine these spectral characteristics of a new radio profile designated as RF profile$_n$ ($BW_{occupied\_n}$, $H(f)_n$, V+D/ DMO Mode).

2. To achieve the previous parameters ($BW_{occupied}$ and $H(f)$) suitably modifying the roll-off factor ($\alpha$) of the root raised cosine (RRC) filter used in the digital modulation of the TETRA communications standard is considered. Regulation ETSI EN 300 392-2 establishes the value of the roll-off factor of the RRC filter for this modulation at $\alpha=0.35$.

The roll-off factor to be implemented in a determined radio profile "n" (RF profile$_n$ ($BW_{occupied\_n}$, $H(f)_n$)) will be:

$$\alpha_{profile\_n} = \min(\alpha_{BW\_n}, \alpha_{H(f)\_n})$$

wherein:

$\alpha_{BW\_n}$: This is the maximum value of the roll-off factor ($\alpha$) which complies with the occupied bandwidth requirement ($BW_{occupied\_n}$) of a determined radio profile "n" (RF profile$_n$);

$\alpha_{H(f)\_n}$: This is the maximum value of the roll-off factor ($\alpha$) which complies with the frequency response or mask requirement ($H(f)_n$) of a determined radio profile "n" (RF profile$_n$).

The value of $\alpha_{BW\_n}$ is obtained solving the following equation:

$$\left(\int_{-\infty}^{+\infty} |S(f,\alpha)|^2 df\right) * \text{percentage} = \int_{-\frac{BW_{occupied}}{2}}^{+\frac{BW_{occupied}}{2}} |S(f,\alpha)|^2 df$$

wherein:

percentage: Designates the total power percentage for which the occupied bandwidth ($BW_{occupied}$) is defined. It is usually 99%, i.e., percentage=0.99.

$S(f, \alpha)$: Frequency response (f) of the signal to transmit and in which $\alpha$ denotes the roll-off factor on which it depends since it has been treated with the root raised cosine filter.

The solution to that equation will be a function which, given a $BW_{occupied}$ and a percentage of the total power for which said bandwidth is defined, will obtain a maximum roll-off factor complying with the condition.

$$\alpha = g_1(BW_{occupied}, \text{percentage})$$

Distinguishing it for the particular case of the radio profile "n" would give the value of $\alpha_{BW\_n}$:

$$\alpha_{BW\_n} = g_1(BW_{occupied\_n}, \text{percentage}\_n)$$

A table is found below including different values of the previous function for a percentage of 99%.

| Roll-off factor ($\alpha_{BW}$) | $BW_{occupied}$ (KHz) (99% $P_{TOTAL}$) |
|---|---|
| 0.05 | 17.972 |
| 0.1 | 18.352 |
| 0.15 | 18.816 |
| 0.2 | 19.326 |
| 0.25 | 19.868 |
| 0.3 | 20.434 |
| 0.35 | 21.016 |
| 0.4 | 21.614 |
| 0.45 | 22.226 |
| 0.5 | 22.846 |

The value of $\alpha_{H(f)\_n}$ is obtained as follows:

$$|S(f,\alpha)| \leq |H(f)| \forall f$$

wherein:

$H(f)$: is the frequency response or mask to be complied with.

$S(f, \alpha)$: Frequency response (f) of the signal to be transmitted and in which a denotes the roll-off factor on which it depends since it has been treated with the root raised cosine filter.

The solution to that equation will be a function which, given a frequency response to be complied with, will obtain a maximum roll-off factor complying with the condition.

$$\alpha = g_2(H(f))$$

Distinguishing it for the particular case of the radio profile "n" would give the value of $\alpha_{H(f)\_n}$:

$$\alpha_{H(f)\_n} = g_2(H(f)\_n)$$

3. Once the roll-off factor ($\alpha_{profile\_n}$) is determined for a determined radio profile "n", if it does not coincide with that defined by the standard ($\alpha_{profile\_n} \neq \alpha_{standard\_TETRA} = 0.35$) it is necessary to define the possible implication on the transmission power of the equipments of the TETRA system when performing this modification.

This is due to the fact that the modification of the roll-off factor ($\alpha$) of the raised root cosine (RRC) filter causes a variation in the peak to mean envelope power ratio (PAR—Peak to Average Ratio). This parameter determines the linearity requirements of the transmitter, therefore if the roll-off factor ($\alpha$) is modified, the required linearity will also be modified and depending on the linearity characteristics of the transmitters of the equipments, it may be necessary to apply a correction in the transmission power.

A table is shown below in which PAR (Peak to Average Ratio) values as a function of the roll-off factor ($\alpha$) are estimated starting from the CCDF (Complementary Cumulative Distribution Function) curves obtained in simulation:

Finally, it gives:

$$RF\_Power\_Tx(\alpha_{profile\_n}) = RF\_Power\_Tx(\alpha_{standard} = 0.35) + \Delta P(\alpha_{profile\_n})$$

$$\Delta P(\alpha_{profile\_n}) g_3(\Delta PAR(\alpha_{profile\_n}), H(f)_{profile\_n}, Tx\_HW\_Limitations)$$

wherein:

$\Delta PAR(\alpha_{profile\_n})$: is the increase of PAR associated with the roll-off factor ($\alpha$) of the radio profile "n" with respect to the roll-off factor $\alpha = 0.35$ of the TETRA standard.

$H(f)_{profile\_n}$: is the frequency response or mask to be complied with.

Tx_Hw_Limitations: restrictions in radioelectric parameters (power, linearity, etc.) of the hardware of the transmitters in the equipments of the system.

This information about the transmission power correction ($\Delta P$) is also included in the characteristics of the radio profile referred to.

Having defined the parameters characterizing a radio profile "n", a code is assigned to it for over-the-air signaling, using the values not used by the TETRA standard of the "System Code" block of the SYNC PDU in combination with the MCC (Mobile Country Code).

| | | TETRA Air coding | | | | |
|---|---|---|---|---|---|---|
| | SYNC | | Radio profile parameters | | | Implementation |
| MCC | PDU "System Code" | Radio Profiles | $BW_{occupied}$ | H(f) (Spectral Mask) | Standard Tetra Mode (V + D or DMO) | in TETRA equipments |
| "XXX" | "1000" | Profile$_1$ | $BW_{occupied\_1}$ | $H_1(f)$ | Mode$_1$ | TETRA Mode = Mode$_1$ Tx: $\alpha_{profile\_1}, \Delta P_1$ Rx: $\alpha_{profile\_1}$ |
| | "1001" | Profile$_2$ | $BW_{occupied\_2}$ | $H_2(f)$ | Mode$_2$ | TETRA Mode = Mode$_2$ Tx: $\alpha_{profile\_2}, \Delta P_2$ Rx: $\alpha_{profile\_2}$ |
| "..." | "..." | ... | ... | ... | ... | ... |
| "YYY" | "1000" | Profile$_{n-1}$ | $BW_{occupied\_n-1}$ | $H_{n-1}(f)$ | Mode$_{n-1}$ | TETRA Mode = Mode$_{n-1}$ Tx: $\alpha_{profile\_n-1}, \Delta P_{n-1}$ Rx: $\alpha_{profile\_n-1}$ |
| | "1001" | Profile$_n$ | $BW_{occupied\_n}$ | $H_n(f)$ | Mode$_n$ | TETRA Mode = Mode$_n$ Tx: $\alpha_{profile\_n}, \Delta P_n$ Rx: $\alpha_{profile\_n}$ |

| Roll-off factor ($\alpha_{profile\_n}$) | Estimated PAR (dB) (Peak-to-Average Ratio) | Increase of PAR with respect to TETRA standard ($\Delta$PAR) (dB) |
|---|---|---|
| 0.05 | ≈6.5 | ≈+3.1 |
| 0.1 | ≈6.0 | ≈+2.6 |
| 0.15 | ≈5.4 | ≈+2.0 |
| 0.2 | ≈4.7 | ≈+1.3 |
| 0.25 | ≈4.2 | ≈+0.8 |
| 0.3 | ≈3.7 | ≈+0.3 |
| 0.35 | ≈3.4 | 0 (TETRA Standard) |
| 0.4 | ≈2.8 | ≈−0.6 |

In the moment in which a determined new radio profile is to be activated, it is encoded in the "System Code" field of the SYNC PDU for a determined MCC and is sent by radio to the equipments of the TETRA communications system which, when decoding this information, implements the modifications of the roll-off factor in Tx as well as the power corrections if they were necessary due to limitations in the linearity of the transmitter.

The roll-off factor of the RRC filter is also modified in Rx to make it equal to that of the transmission and to thus optimize the signal to noise ratio (SNR) when using a filter adapted to the received signal.

The definition of the radio profile "n" also includes information about the V+D (Voice+Data) operation mode according to ETSI IN 300 392 standard or DMO (Direct Mode Operation) according to ETSI IN 300 396 standard which is to be used.

BRIEF DESCRIPTION OF THE DRAWINGS

A more detailed description of the preferred embodiment of the method proposed by the present invention will be provided below, this description being complemented by the following figures:

FIG. 2: SYNC PDU content defined in document ETSI EN 300 392-2.

FIG. 4: SYNC PDU content defined in document ETSI EN 300 396-3.

DESCRIPTION OF A PREFERRED EMBODIMENT

Figure 1:
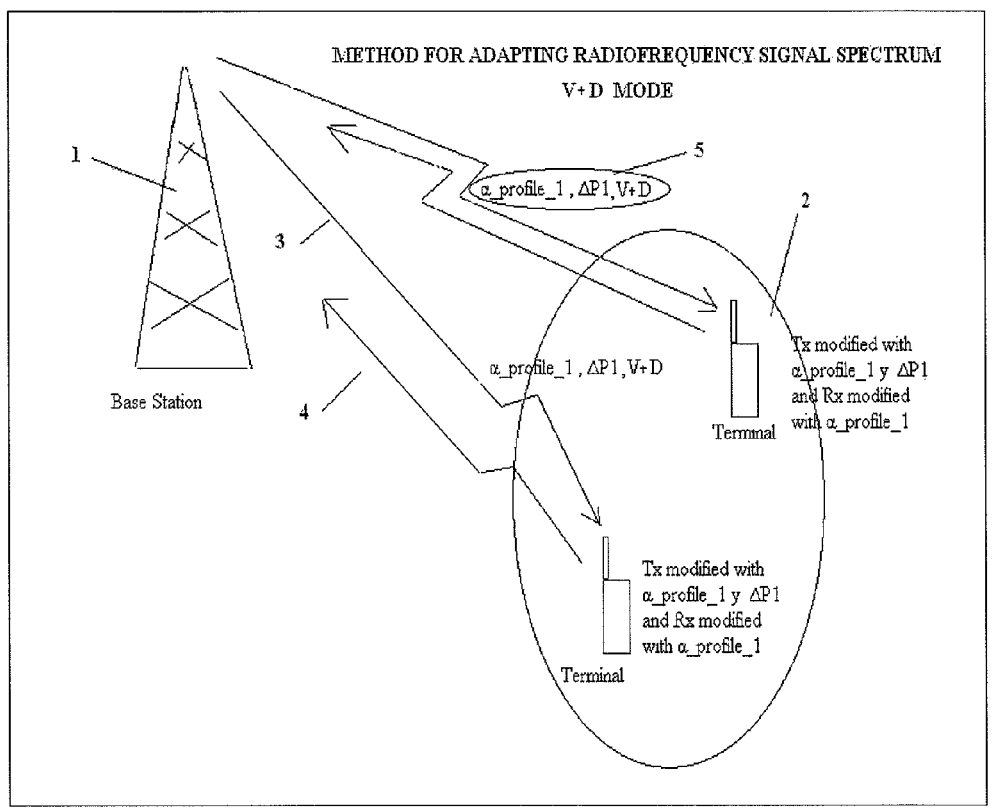
FIG. 1: V+D Mode: TETRA system with radio profile signaling.

As stated above, the solution proposed by the present invention consists in the over-the-air notification of the configuration of certain transmission and reception parameters for communications systems according to the TETRA standard.

Specifically, the configurable parameters can be, among others, the roll-off factor ($\alpha$) of the root raised cosine (RRC) filter, used both in transmission and in reception, and the transmission power.

In the present solution, the roll-off factor of the RRC reception filter is equal to that of the transmission filter. Both filters are thus adapted, i.e., one is the complex conjugate of the other, thus minimizing inter-symbol interference (ISI) and optimizing the signal to noise ratio in the receiver.

The signaling object of the invention is performed by using the unused values of the "System Code" block of the SYNC PDU defined by the TETRA standard. This field consists of four bits and out of the possible values it may have, two are not used: "1000" and "1001". The combination of the country code or MCC programmed in the terminals and the value of the "System Code" block is used to define the radio profile to be used in a determined TETRA system.

In the present solution, a communications system based on the TETRA standard for the United States is considered, which system can use two types of digital modulations: π/4-DQPSK and π/8-D8PSK. The data transmission rates for these two modulations are 36 Kbps and 54 Kbps, respectively.

By way of example, encoding the following radio profiles is proposed:
Pure TETRA standard. This is the standard used by default.
The characteristics of the radiofrequency signal are those defined in the documents ETSI EN 300 392-2 "*Terrestrial Trunked Radio (TETRA); Voice plus Data (V+D); Part 2: Air Interface (AI)*" and ETSI EN 300 396-2 "*Terrestrial Trunked Radio (TETRA); Technical requirements for Direct Mode Operation (DMO); Part 2: Radio aspects*". Therefore, the roll-off factor ($\alpha$) of the RRC filter is 0.35 and the transmission power should not be modified.

V+D USA profile. In this case, to comply with the limits established by the FCC (Federal Communications Commission) in Part 90 of Chapter 1 of publication Title 47 (47cfr90, "Title 47—Telecommunication; Chapter I—Federal Communications Commission; Part 90—Private Land Mobile Radio Services"), it is necessary to reduce the roll-off factor to 0.2. In relation to the variation of the power with respect to the nominal value of the equipments, $\Delta P$, as later described, maintaining nominal power level ($\Delta P=0$ dB) is established for this profile. This profile is associated with the V+D operation mode.

DMO USA profile. A third profile with the same values of $\alpha$ and $\Delta P$ as in the previous case is proposed to comply with the requirements of Part 90 of the FCC regulation, but associated with the DMO operation mode.

The following summarizes the three profiles proposed in the present solution:

| MCC[1] | "System Code"[2] | Profiles | Comments |
|---|---|---|---|
| 310-316 | 0xxx<br>101x<br>11xx | Pure TETRA standard | $\alpha = 0.35$; $\Delta P = 0$ dB<br>Associated with different versions of the EN/ETS 300 392-2 and EN 300 392-7 for V + D and EN/ETS 300 396 for DMO standards. |
| 310-316 | 1000 | V + D USA profile | $\alpha = 0.2$; $\Delta P = 0$ dB<br>EN/ETS 300 392-2<br>(EN/ETS 300 392-7 if there are security functions) |
| 310-316 | 1001 | DMO USA profile | $\alpha = 0.2$; $\Delta P = 0$ dB<br>EN/ETS 300 396 |

Figure 5:
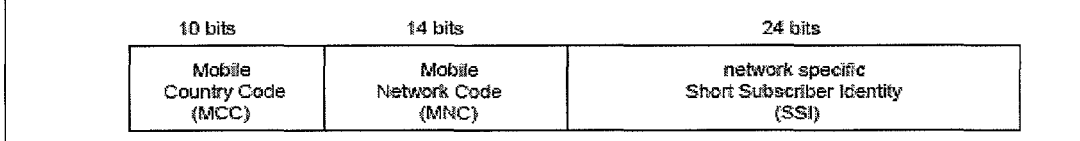
FIG. 5: Structure of the identification information of the equipments in the system. This information includes the country identifier block or MCC (Mobile Country Code).

[1]FIG. 5 shows the MCC (Mobile Country Code) field defined in the TSI (TETRA Subscriber Identity) block.
[2]FIGS. 2 and 4 show the "System Code" field within the SYNC PDU defined in the TETRA standard.

Once the possible radio profiles are established, the latter are programmed both in the base stations and in the terminals.

FIG. 1 shows a TETRA system in which the base station (1) transmits (3), through the BSCH logical channel, the SYNC PDU with the "System Code" field at the value corresponding to the radio profile (5) which must be used in said system. When the terminals (2) receive said information, they configure the roll-off factor and the transmission power according to what is indicated in the "System Code", then launching the request registration PDU (4).

Figure 3:
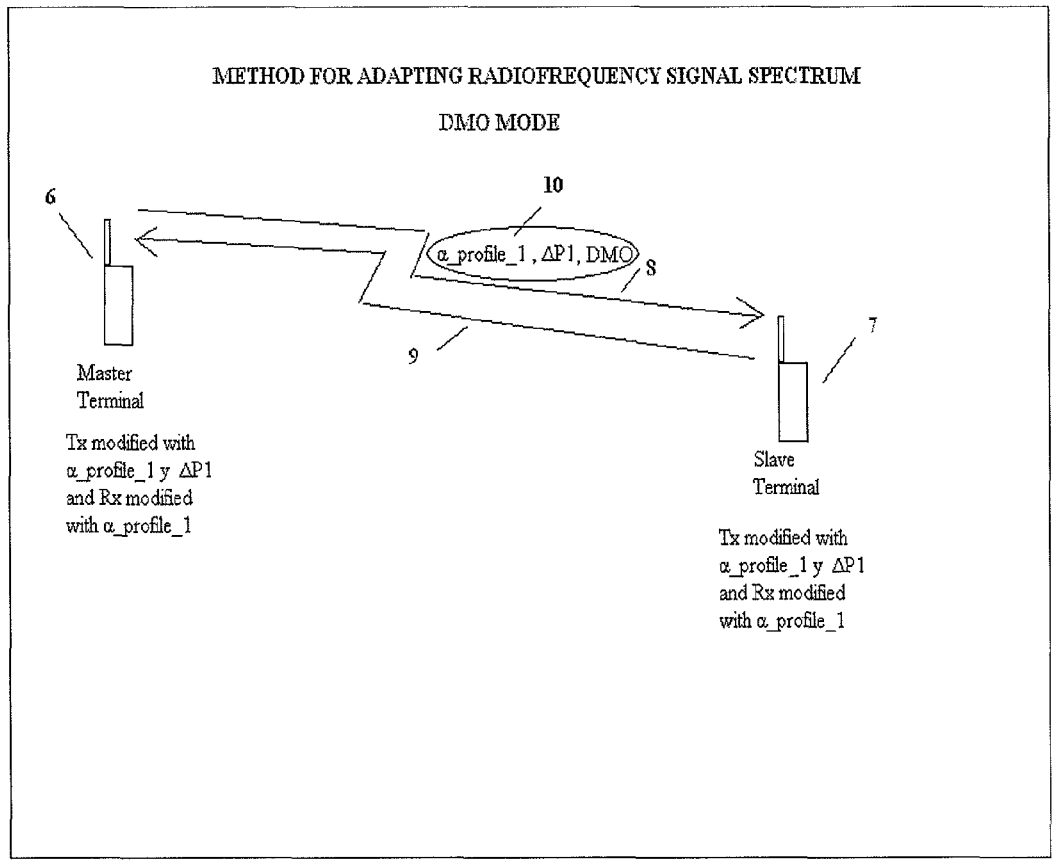
FIG. 3: DMO Mode: TETRA system with radio profile signaling.

FIG. 3 shows a TETRA system in DMO mode in which the "master" terminal (6) transmits (8), through the SCH/S and SCH/H logical channels, the SYNC PDU with the "System Code" field at the value corresponding to the radio profile (10) which must be used in said system. When the "slave" terminal (7) receives said information, it configures the roll-off factor and the transmission power according to what is indicated in the "System Code".

Figure 6:
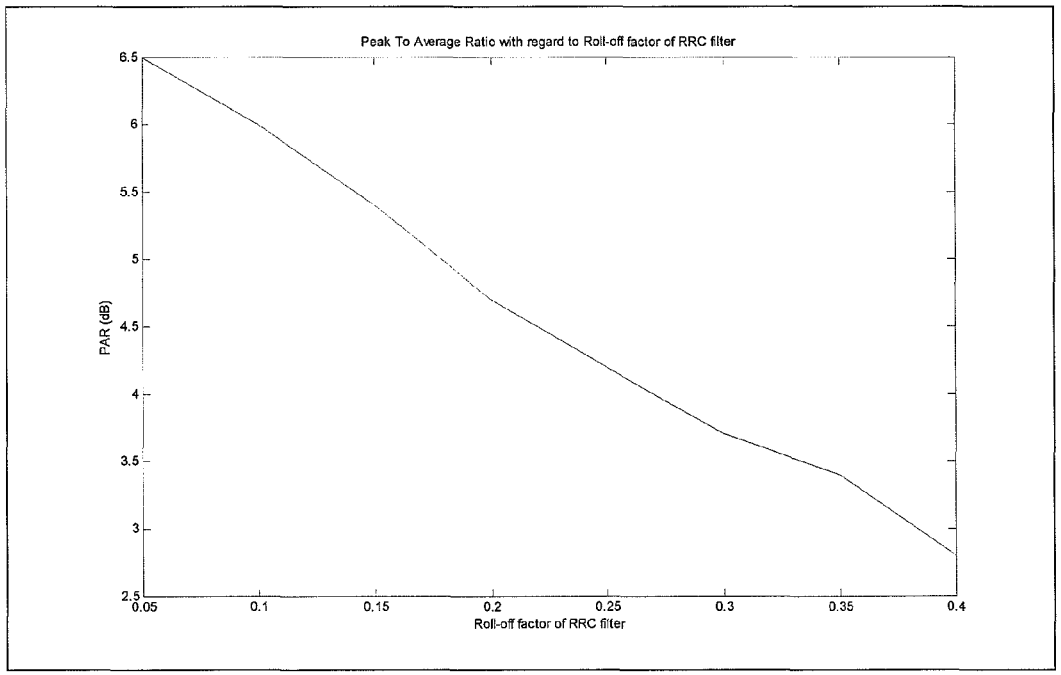
FIG. 6: Comparison of the peak to mean envelope power ratio (PAR: Peak to Average Ratio) of a signal with digital modulation π/4-DQPSK, for different values of the roll-off factor of the RRC filter.
Figure 7:
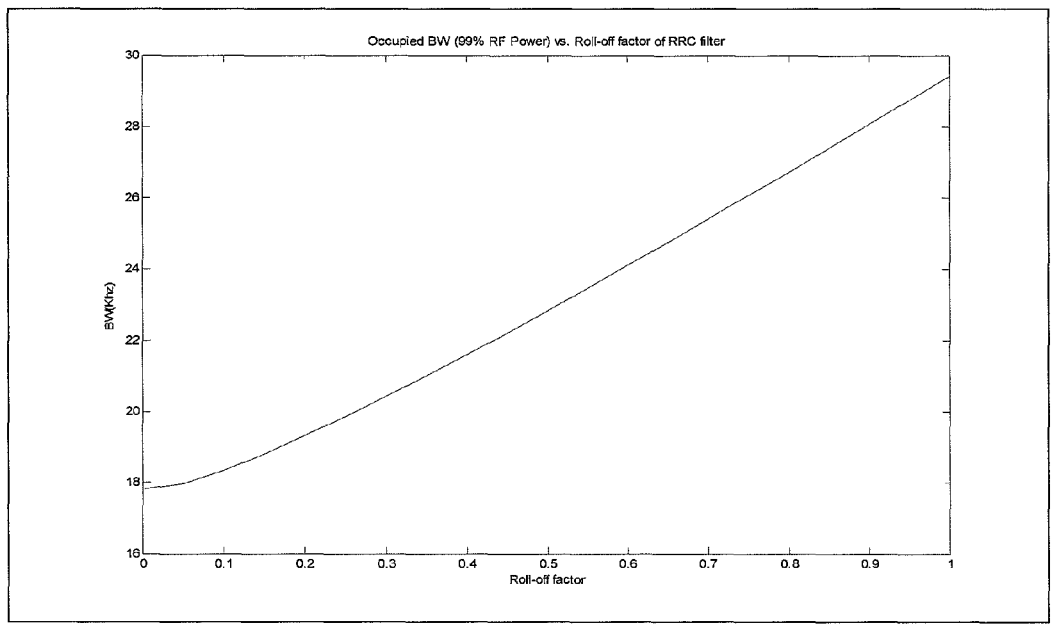
FIG. 7: Bandwidth occupied by a signal with digital modulation π/4-DQPSK for different values of the roll-off factor of the RRC filter.

FIG. 6 shows how the peak to mean envelope power ratio (PAR) varies as a function of the roll-off factor used. For $\alpha=0.35$ (TETRA Standard Profile), PAR=3.4 dB; for $\alpha=0.2$ (USA Profile), PAR=4.7 dB.

Distinguishing for the V+D USA profile and for the DMO USA profile it gives:
  a) With respect to the occupied bandwidth limit ($BW_{occupied\_USA}$).

Section 90.209 of the FCC regulations sets the occupied bandwidth limit for signals with 25 KHz channeling at 20 KHz.

$$BW_{occupied\_USA} = 20 \text{ KHz}(99\% \text{ RF power})$$

According to the graph in FIG. 4, the roll-off factor ($\alpha$) for complying with this limit must be equal to or less than 0.25.

$$\alpha_{BW\_USA} \leq 0.25$$

b) With respect to the frequency response limit $(H(f)_{USA})$. In order to comply with the applied emission masks which are defined in section 90.210 of the FCC regulation, it is necessary to reduce the roll-off factor to at least 0.2.

$$H(f)_{USA} = \text{Emission Mask}_{FCC\ 47\ CFR\ \S 90.210}$$

$$\alpha_{H(f)\_USA} \leq 0.2$$

Figure 8:
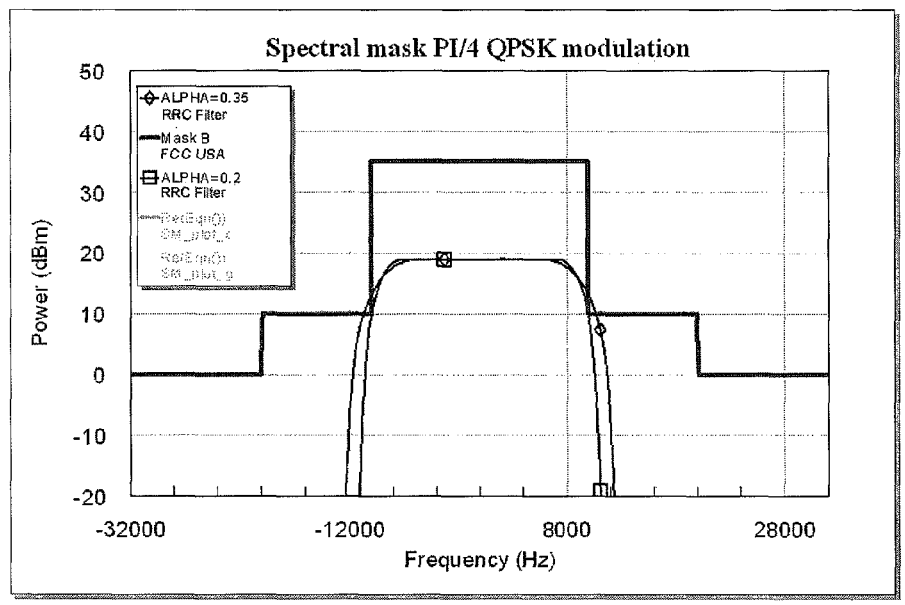
FIG. 8: Comparison of the spectrum of a signal with digital modulation π/4-DQPSK for a roll-off factor of the RRC filter of 0.35 and of 0.2 compared to the spectral mask B defined by Part 90 of the FCC regulation applied in the United States of America.

FIG. 8 shows the specific case of the application of the emission mask referred to as "B" and defined in the mentioned regulation.

Therefore, and according to the previously described equation:

$$\alpha_{profile\_USA} = \min(\alpha_{BW\_USA}, \alpha_{H(f)\_USA}) = \min(0.25, 0.2) = 0.2$$

$$\alpha_{profile\_USA} = 0.2$$

c) With respect to the power correction. ($\Delta P_{USA}$).

For a roll-off factor of the RRC filter of 0.2, an increase in PAR of the modulated signal of approximately 1 dB according to FIG. 6 is given. The power correction $\Delta P_{USA}$ for compensating the increase of PAR depends on the linearity characteristics in the transmitters of the different equipments of the network and of the spectral requirements applied (emission masks according to section 90.210 of the FCC regulation). If these equipments can absorb these new requirements, the original power can be maintained and, therefore, $\Delta P_{USA} = 0$ dB.

The invention claimed is:

1. A method for adapting radiofrequency signal spectrum of a communications system based on a Terrestrial Trunked Radio (TETRA) standard, characterized in that it comprises the following steps:
   a) determining a required radio profile for the radiofrequency signal used in the communications system, according to a specific radioelectric spectrum use requirements of a country in which the communication system operates;
   b) modifying a configurable transmission and reception parameters of a base station in Voice plus Data mode, V+D, or of a master terminal in Direct Mode Operation mode, DMO, according to the required radio profile;
   c) encoding and sending by radio said required radio profile information to terminals of the TETRA communications system using the TETRA standard signaling, using data fields reserved for generic use;
   d) decoding said radio profile information and modifying the configurable transmission and reception parameters of the terminals of the TETRA communications system according to information received about the required radio profile.

2. The method for adapting radiofrequency signal spectrum according to claim 1, wherein the required radio profile in the communication system is dynamically configured by sending the information over-the-air through the TETRA standard signaling.

3. The method for adapting radiofrequency signal spectrum according to claim 1, wherein the information about the required radio profile is encoded and sent using values not used by the TETRA standard of a "System Code" block within a SYNC PDU in combination with a country code MCC, which allows this adapting to be performed dynamically.

4. The method for adapting radiofrequency signal spectrum according to claim 1, wherein the information about the required radio profile determines a roll-off factor, $\alpha$, of a root raised cosine filter, RRC, used by the terminals of the communications system in transmission and in reception.

5. The method for adapting radiofrequency signal spectrum according to claim 4, wherein the required radio profile also determines a transmission power level used.

6. The method for adapting radiofrequency signal spectrum according to claim 5, wherein the required radio profile also determines an operation mode of the TETRA standard which is going to be used, selected from Voice plus Data, V+D, or Direct Mode Operation, DMO.

7. The method for adapting radiofrequency signal spectrum according to claim 1, wherein it is the base station which sends via radio the required radio profile to the terminals in Voice plus Data (V+D) operation mode.

8. The method for adapting radiofrequency signal spectrum according to claim 1, wherein it is the master terminal which sends via radio the required radio profile to the remaining terminals, in direct mode operation (DMO).

9. The method for adapting radiofrequency signal spectrum according to claim 5, wherein both the roll-off factor and the transmission power level are modified to adapt a spectral characteristics of the radiofrequency signal to a specific limits of each country.

10. The method for adapting radiofrequency signal spectrum according to claim 4, wherein to adapt a spectral characteristics of the radiofrequency signal to radioelectric requirements established for the USA, the roll-off factor of the RRC filter is reduced with respect to its standard value, both in the transmission and in the reception.

11. A system for adapting radiofrequency signal spectrum of a communications systems according to a Terrestrial Trunked Radio (TETRA) standard, characterized in that it comprises:
   a) means for determining a required radio profile for the radiofrequency signal used in the communications system, according to a specific radioelectric spectrum use requirements of a country in which the communication system operates;
   b) means for modifying a configurable transmission and reception parameters of a base station in Voice plus Data, V+D, mode, or of a master terminal in Direct Mode Operation, DMO, mode according to the required radio profile;
   c) means for encoding and sending by radio said required radio profile to terminals) of TETRA communications system through the TETRA standard signaling, using data fields reserved for generic use;
   d) means for decoding said information and modifying the configurable transmission and reception parameters of the terminals of the TETRA communications system according to the required radio profile.

12. The system for adapting radiofrequency signal spectrum according to claim 11, wherein the required radio profile in the system of communication is dynamically configured by sending the corresponding information over-the-air through the TETRA standard signaling.

13. The system for adapting radiofrequency signal spectrum according to claim 11, wherein the information about the required radio profile is encoded and sent using the values not used by the TETRA standard of a "System Code" block within a SYNC PDU in combination with a country code MCC.

14. The system for adapting radiofrequency signal spectrum according to claim 11, wherein the information about the required radio profile determines a roll-off factor, α, of a root raised cosine filter, RRC, used by the terminals of the communications system in transmission and in reception.

15. The system for adapting radiofrequency signal spectrum according to claim 14, wherein the required radio profile also determines a transmission power level used.

16. The system for adapting radiofrequency signal spectrum according to claim 15, wherein the required radio profile also determines an operation mode of the TETRA standard which is going to be used, selected from Voice plus Data, V+D, or Direct Mode Operation, DMO.

17. The system for adapting radiofrequency signal spectrum according to claim 1, wherein it is the base station which sends via radio the required radio profile to the terminals in Voice plus Data (V+D) operation mode.

18. The system for adapting radiofrequency signal spectrum according to claim 11, wherein it is the master terminal which sends via radio the required radio profile (to the remaining terminals, in direct mode operation (DMO).

19. The system for adapting radiofrequency signal spectrum according to claim 15, wherein both the roll-off factor and the transmission power level are modified to adapt a spectral characteristics of the radiofrequency signal to a specific limits of each country.

20. The system for adapting radiofrequency signal spectrum according to claim 14, wherein to adapt a spectral characteristics of the radiofrequency signal to the radioelectric requirements established for the USA, the roll-off factor of the RRC filter is reduced with respect to its standard value, both in the transmission and in the reception.

21. A computer program product, including non-transitory computer readable media, the media comprising instructions to enable the computer to perform following steps:
  a) determining a required radio profile for the radiofrequency signal used in a Terrestrial Trunked Radio (TETRA) communications system, according to a specific radioelectric spectrum use requirements of a country in which the communication system operates;
  b) modifying a configurable transmission and reception parameters of a base station in Voice plus Data mode, V+D, or of a master terminal in Direct Mode Operation mode, DMO, according to the required radio profile;
  c) encoding and sending by radio said required radio profile to terminals of the TETRA communications system using the TETRA standard signaling, using data fields reserved for generic use;
  d) decoding said information and modifying the configurable transmission and reception parameters of the terminals of the TETRA communications system according to information received about the required radio profile.

* * * * *